United States Patent [19]
Hörger et al.

[11] Patent Number: 5,785,451
[45] Date of Patent: Jul. 28, 1998

[54] CONNECTING FITTING

[75] Inventors: Horst Hörger, Sontheim, Germany; Erich Röck, Höchst, Austria

[73] Assignee: Julius Blum Gesellschaft m.b.H., Höchst, Austria

[21] Appl. No.: 699,637

[22] Filed: Aug. 19, 1996

[30] Foreign Application Priority Data

Aug. 21, 1995 [AT] Austria ................ 1411/95

[51] Int. Cl.$^6$ ................ F16B 12/20
[52] U.S. Cl. ............... 403/408.1; 403/245; 403/405.1; 403/407.1
[58] Field of Search ............ 403/405.1, 406.1, 403/407.1, 245

[56] References Cited

U.S. PATENT DOCUMENTS

| 538,753 | 5/1895 | Swan | 403/407.1 |
|---|---|---|---|
| 3,456,969 | 7/1969 | Wittenmayer | 403/406.1 |
| 4,553,873 | 11/1985 | Salice | 403/245 |
| 4,582,446 | 4/1986 | Salice | 403/245 |
| 4,697,946 | 10/1987 | Rock et al. | 403/407.1 X |
| 5,540,515 | 7/1996 | Rock et al. | 403/407.1 |

FOREIGN PATENT DOCUMENTS

| 141 702 | 5/1980 | German Dem. Rep. . |
|---|---|---|
| 201 933 | 8/1983 | German Dem. Rep. . |
| 31 22 978 | 1/1983 | Germany . |
| 31 27 795 | 2/1983 | Germany . |
| 1476214 | 4/1989 | Russian Federation ........ 403/407.1 |

*Primary Examiner*—Anthony Knight
*Attorney, Agent, or Firm*—Wenderoth, Lind & Ponack

[57] ABSTRACT

A connecting fitting for releasably connecting two platelike furniture members includes two connecting members which are adapted to be secured to respective of the furniture members. A first connecting member is in the form of a casing with a cylindrical shell in which is positioned a spring loaded rotary wedge. The casing has an opening in its cylindrical shell through which the head of the pin-like connecting member is insertable into the casing. The rotary wedge releasably engages the underside of the head of the pin-like connecting member when in the inserted position. A tightening element is provided in the casing and is acted upon by a spring whereby rotation of the tightening element will result in rotation of the rotary wedge and vice versa.

19 Claims, 18 Drawing Sheets

CONNECTING FITTING

BACKGROUND OF THE INVENTION

1. Field of the Invention

This invention relates to a connecting fitting for releasably connecting two furniture members, preferably two plate-like furniture members. The connecting fitting includes connecting members which are adapted to be secured to respective of the furniture members. A first connecting is pin-shaped member or pin-like and has a head and a shank, and the second connecting member is in the form of a casing with a cylindrical shell in which is positioned a spring loaded rotary wedge and having an opening in its cylindrical shell through which the head of the first connecting member is insertable into the casing. The rotary wedge is operable to releasably engage the underside of the head of the pin-like connecting member when in the inserted position.

2. Description of the Prior Art

Austrian Patent 390 480 describes a connecting fitting with a pin-like connection member adapted to be fastened in a first furniture part and a rotary wedge adapted to be situated in a bore in a second furniture part. When the two furniture parts abut each other, a head of the pin-like connecting member extends, the rotary wedge into a bore in the second furniture part. By turning the rotary wedge by means of a screw driver is interlocked with the bead of the pin-like connecting member and pulls the same further into the bore.

The U.S. Pat. No. 4,582,446 describes a connecting fitting with a pin-like connecting member adapted to be fastened in a first furniture part and connecting member in the form of a dowel casing adapted to be secured within a bore in a second furniture part. A rotary wedge which is biased by a spring is situated in the dowel casing. When the pin-like connecting member is inserted into a receiving opening in the dowel casing it is interlocked with the rotary wedge. The rotary wedge is rotated by the spring and thereby pulls the pin-like connecting member further into the dowel casing. A handle lever is provided, by means of which the rotary wedge can be moved in a retracting or unlocking direction. Means for locking the rotary wedge in its retracted position are also provided. When the rotary wedge is in its retracted position the handle lever also has to be retracted so that the rotary wedge can respond to the insertion of the pin-like connecting member.

SUMMARY OF THE INVENTION

It is an object of the present invention to provide an improved connecting fitting of the afore described type, but wherein after retraction of a locking member to release a pin-like connecting member, no further action is necessary to bring the locking member into an operating position.

According to the invention this object is accomplished by a provision of a tightening element being provided in a casing and acted upon by a spring, whereby rotation of the tightening element will result in rotation of a rotary wedge and vice versa.

By means of such improved connecting fitting, two furniture walls can be connected to each other without the employment of a tool. A tool is necessary for separating the furniture walls, but after that the connecting members of the connecting fitting are placed in operating positions without further manipulation.

DESCRIPTION OF THE PREFERRED EMBODIMENT

Figure 1:
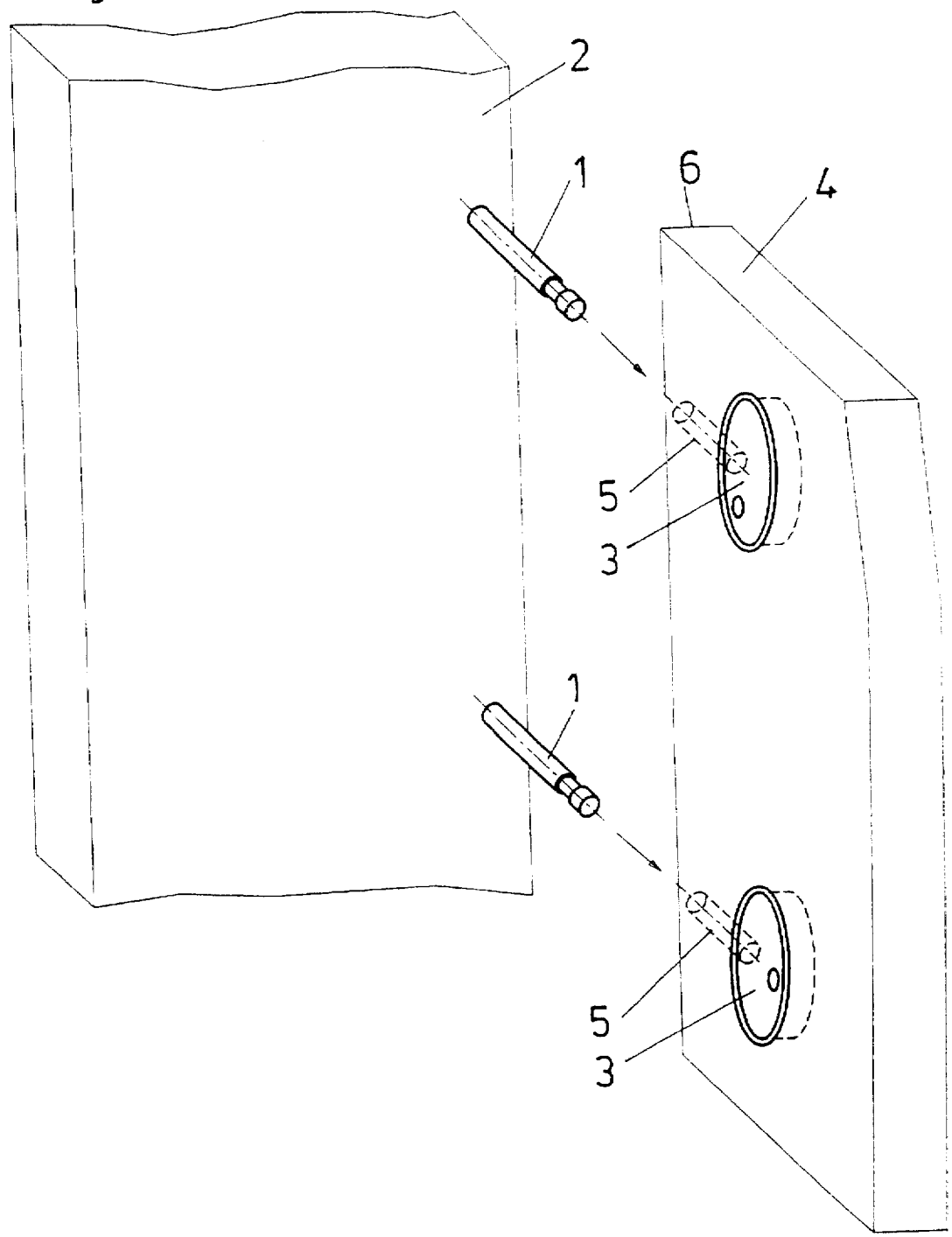
FIG. 1 is a perspective view showing two furniture parts and two connecting members of a connecting fittings.
Figure 2:
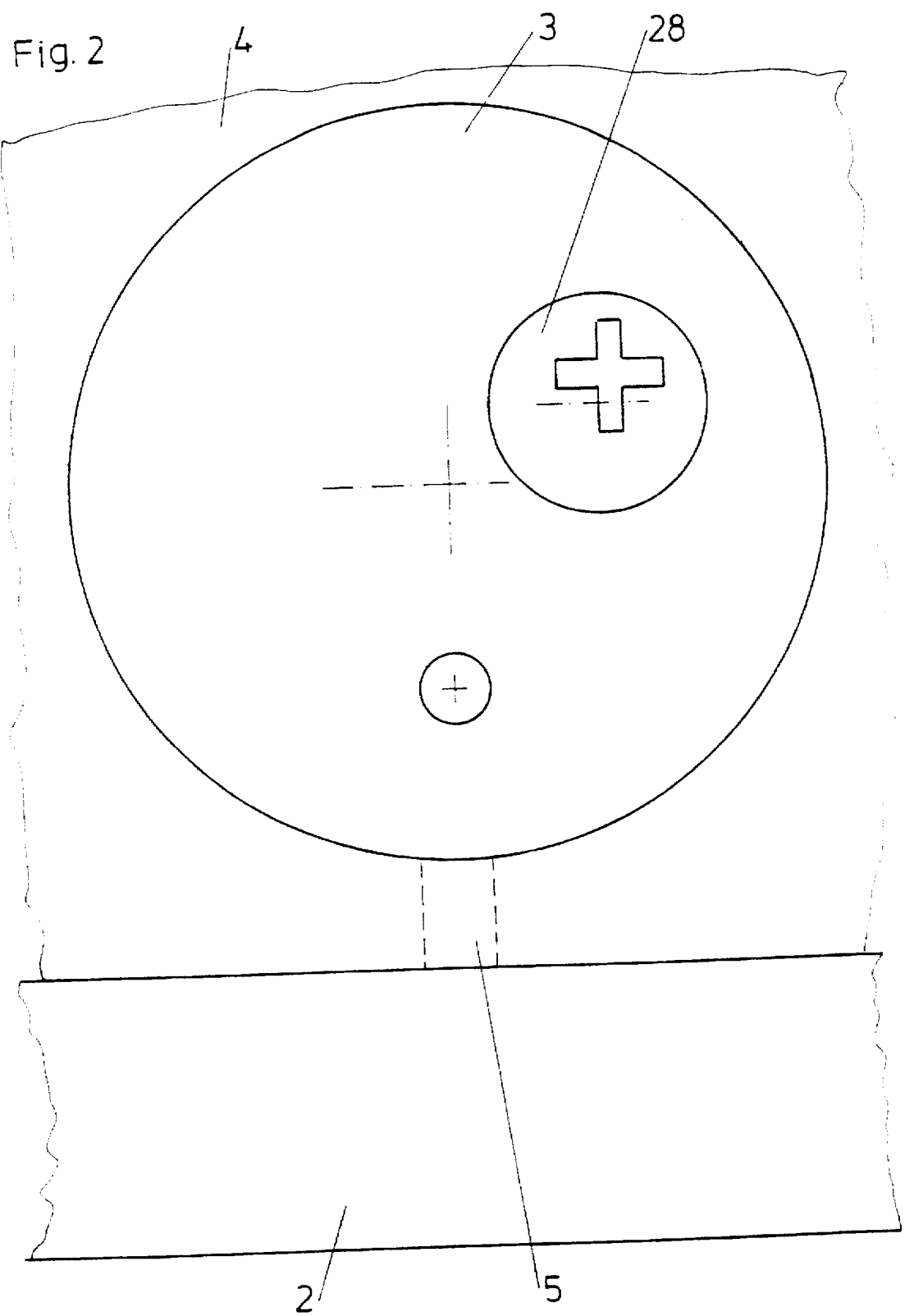
FIG. 2 is a plan view of a casing.
Figure 4:
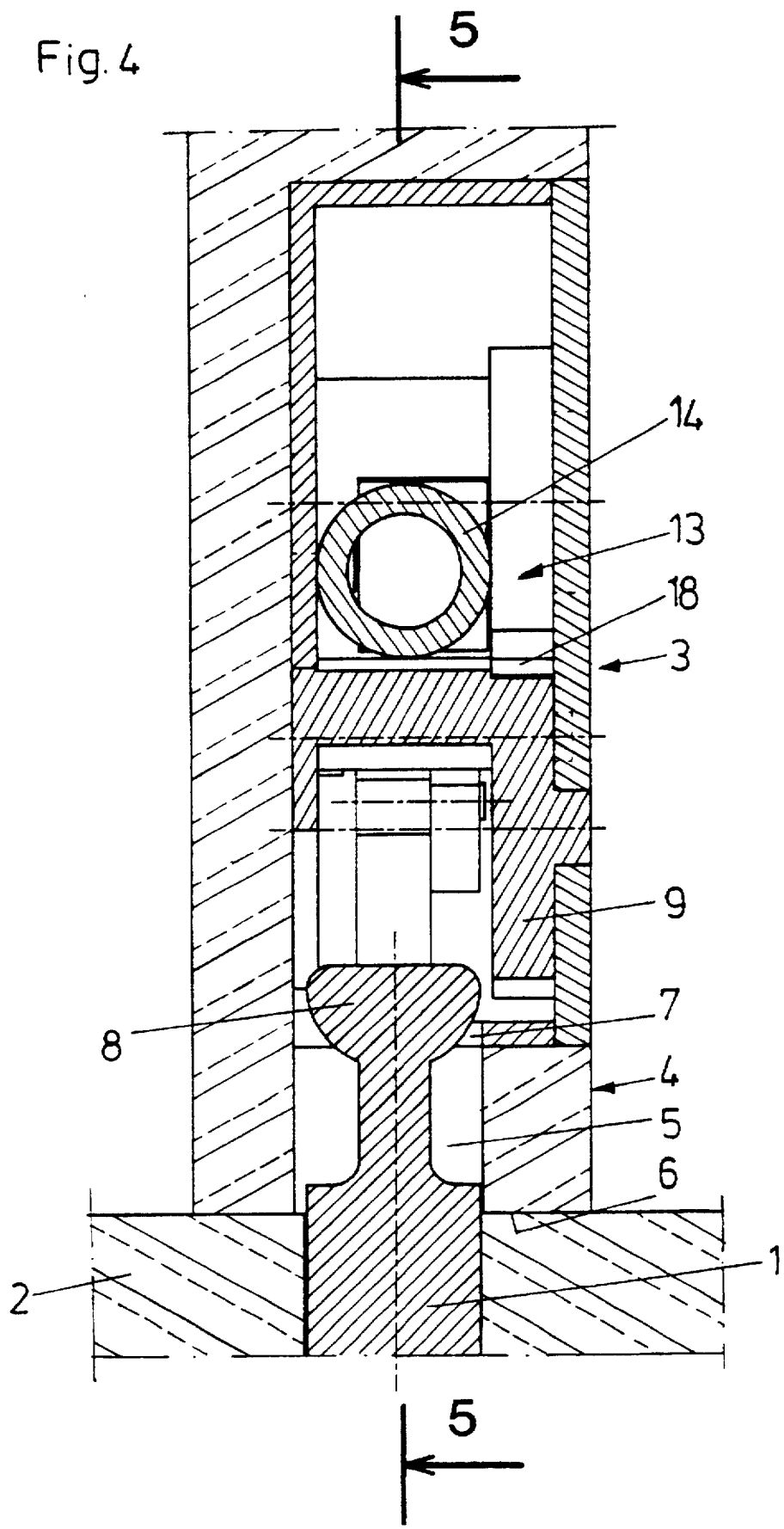
FIG. 4 is a sectional view taken on line 4—4 of FIG. 3.

As shown in FIG. 1 pin-like connecting members 1 are fastened to a plate-like furniture member 2 and casings 3 are inserted in milled bores in another plate-like furniture member 4. The pin-like connecting members 1 may for example be held by means of dowels in the furniture member 2. In the furniture member 4 are provided bore 5 which extend from a front face 6 of the furniture member 4 into the milled bores where the casings 3 are situated. Each casing 3 is provided with an opening (FIG. 4) in its shell through which the pin-like connecting member 1 can be inserted into the casing 3. The pin-like connecting member 1 is at its free end provided with a head 8 which when the pin-like connecting member 1 is inserted into the casing 3 is held in a locking position by a rotary wedge 9 which is situated within the casing 3.

The rotary wedge 9 is provided with an opening 10 and a slot 11 into which the pin-like connecting member 1 projects. The pin-like connecting member is inserted into the rotary wedge 9 by means of the opening 10. After rotation of the rotary wedge 9, the neck of the pin-like connecting member 1 is situated in the slot 11 of the rotary wedge 9 and the head 8 of the pin-like connecting member 1 is held by two rims 12 situated on opposite sides of the slot 11. The rims 12 are surfaces extending in the form of a spiral. A turnable element 13 is provided in the casing 3. Rotation of this tightening element 13 is possible in clockwise and counter clockwise directions. A spring 14 acts on the tightening element 13, whereby spring 14 is moved over a dead center position during rotation of the tightening element 13. In the embodiment shown in spring 14 is a tension spring and is mounted on the casing at 15 is connected to the tightening element 13 at 16. The rotary wedge 9 and the tightening element 13 are provided with respective toothed racks 17, 18 meshing with each other. The two racks 17, 18 extend over approximately one third of the circumferences of the rotary wedge 9 and the tightening element 13.

Figure 10:
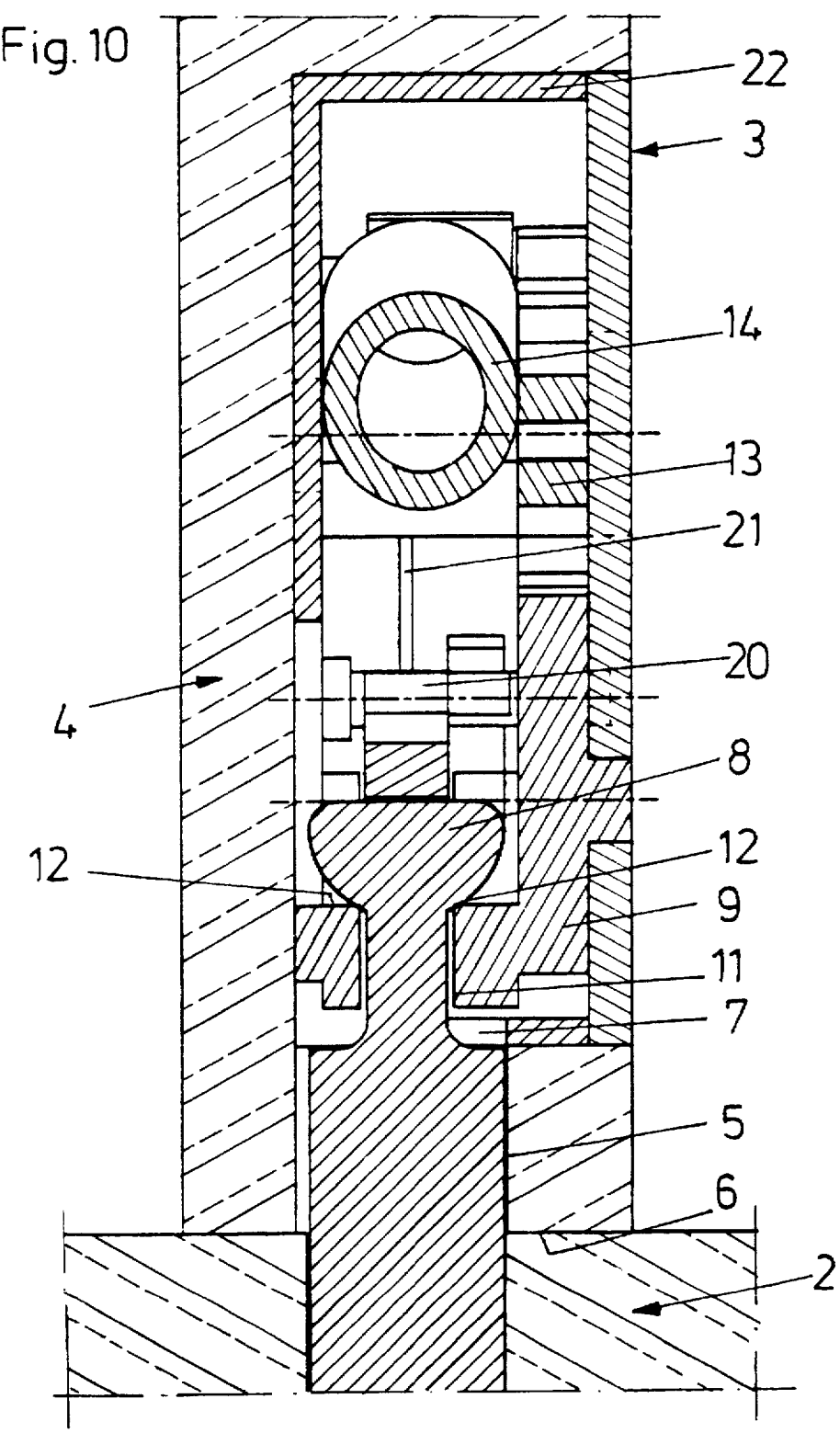
FIG. 10 is a sectional view taken along line 10—10 of FIG. 9.
Figure 11:
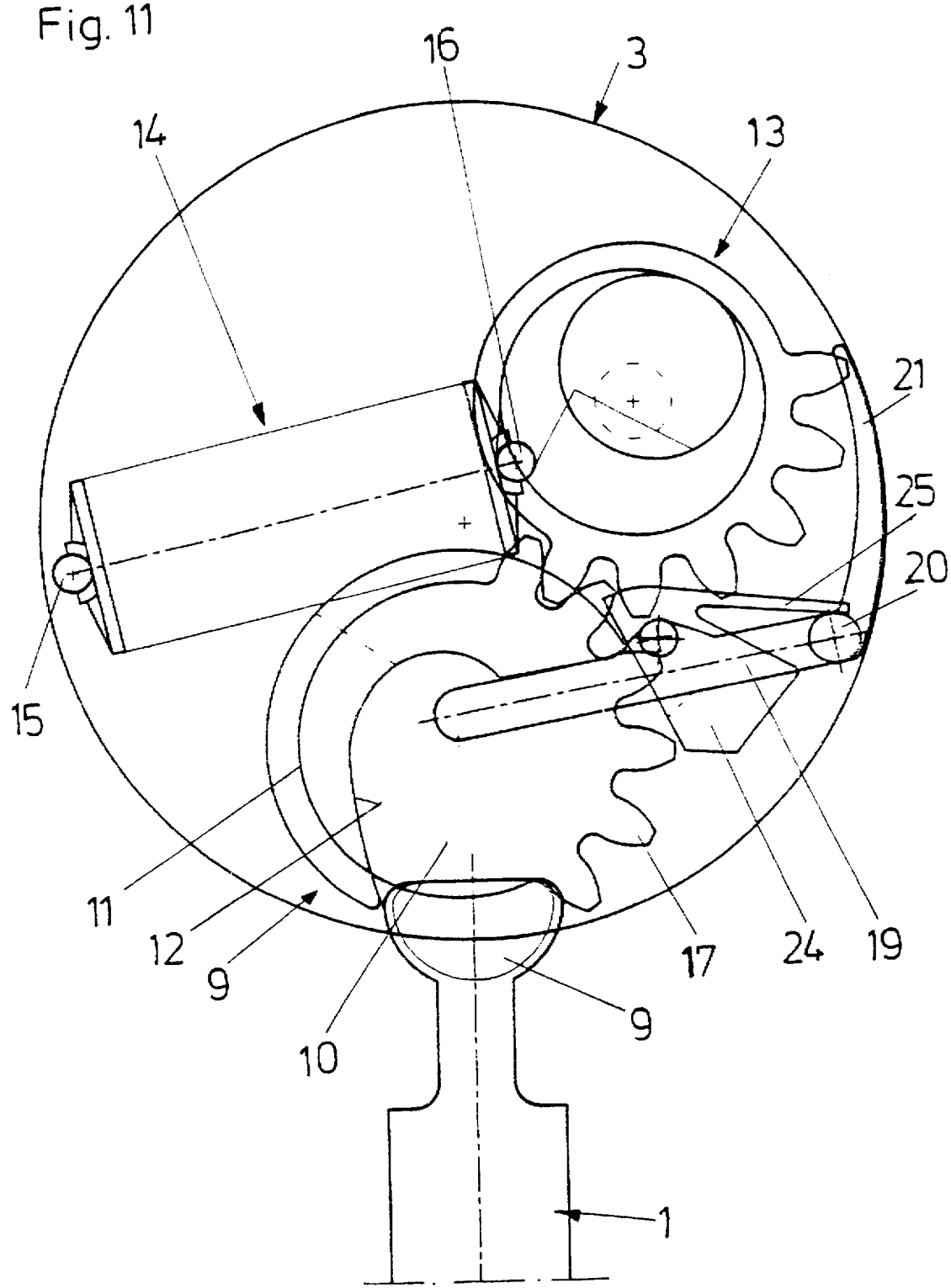
FIG. 11 is a schematic view showing the position of the members of the connecting fitting when the pin-like connecting member is unlocked.
Figure 12:
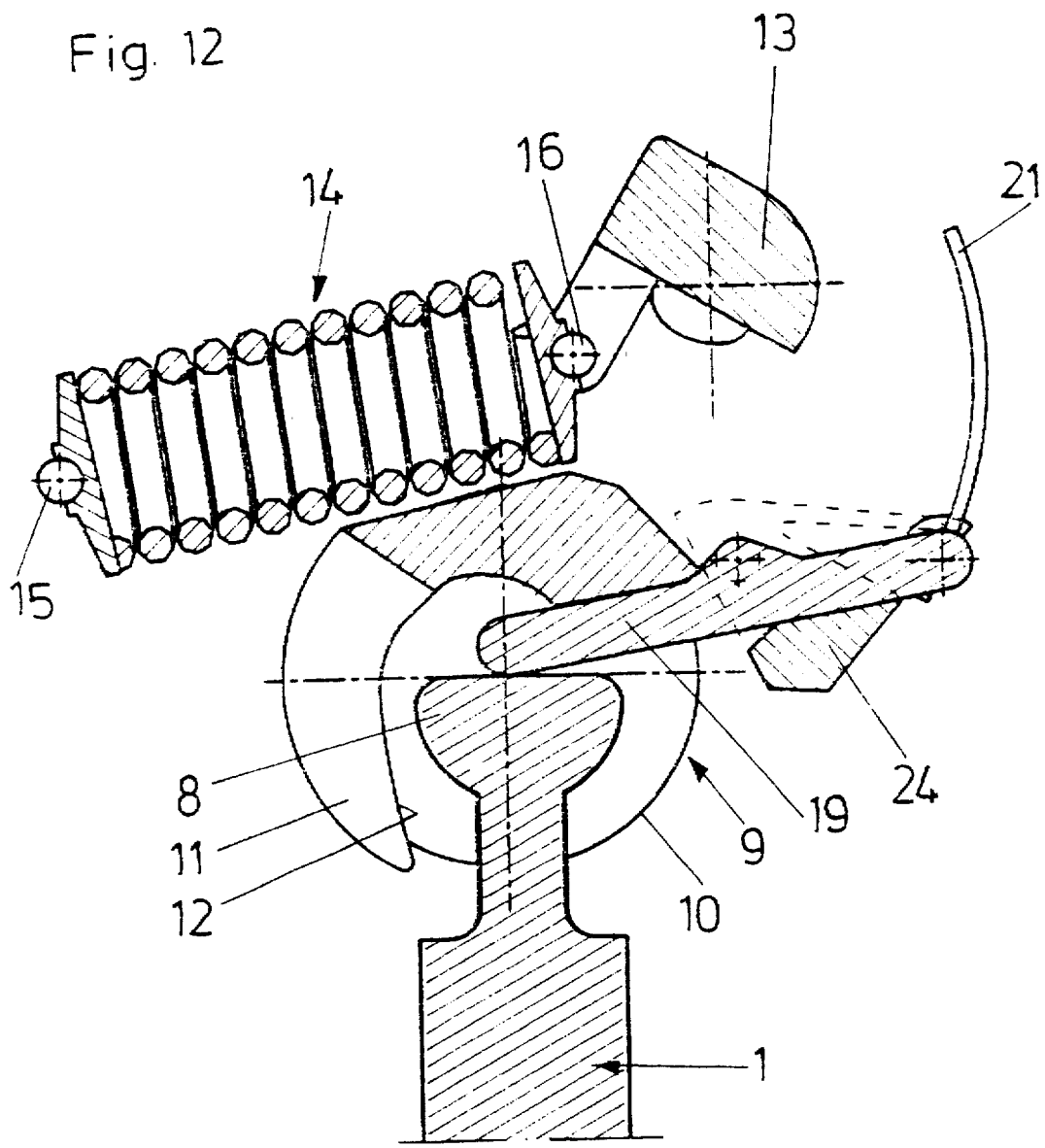
FIG. 12 is a sectional view of the members of the connecting fitting when the pin-like connecting member is unlocked but still in an inserted position.
Figure 13:
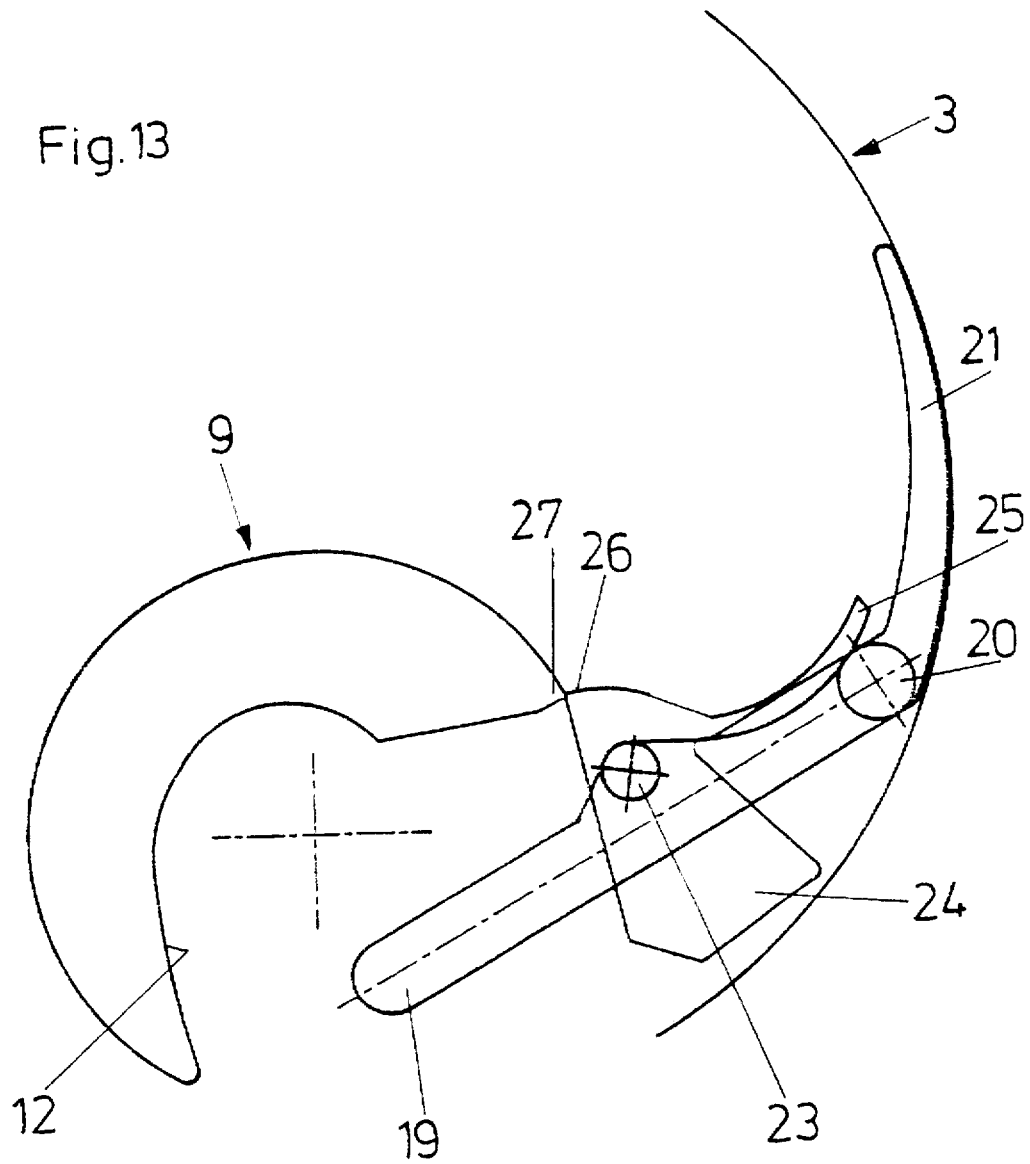
FIG. 13 is a schematic view of a rotary wedge, a lever and a tilting lever in positions in which the pin-like connecting member can be pulled out of the casing.
Figure 14:
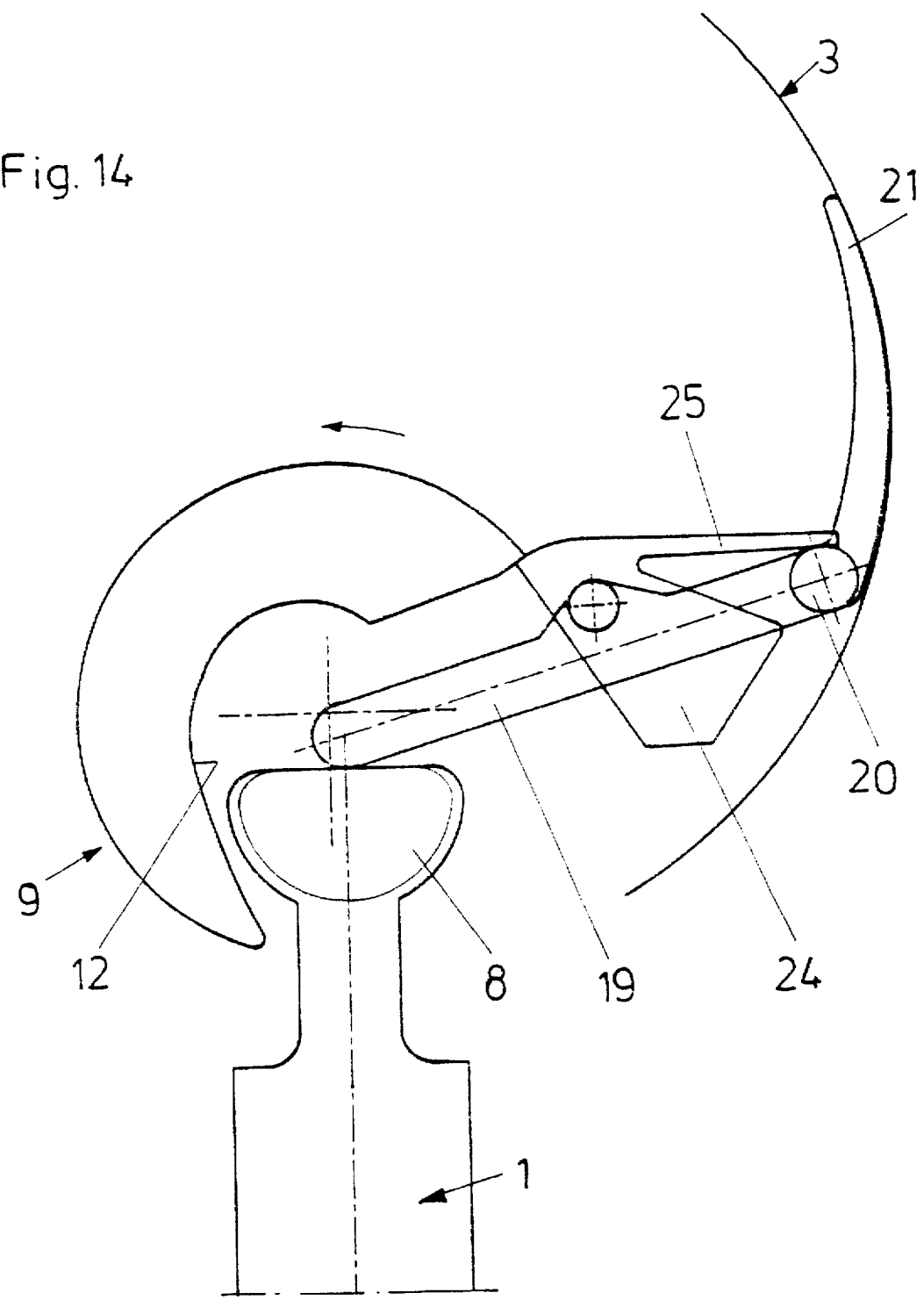
FIG. 14 is a view similar to FIG. 13, but with the pin-like connecting member being inserted half-way into the casing.

A lever 19 is pivotally mounted on an axle 20 within the casing 3. Lever 19 has a free and projecting into the rotary wedge 9. The lever 19 is provided with a spring 21 which abuts the inner surface of shell 22 of the casing 3 (FIG. 10) and which urges the lever 19 into the counter clockwise direction. By the action of the spring 21 the lever 19 is moved towards the opening 7 in the casing 3. Approximately at the middle of the lever 19 is provided an axle 23 on which is mounted a tilting lever 24. The tilting lever 24 is also provided with a spring 25 which abuts the lever 19 or the axle 20.

Figure 3:
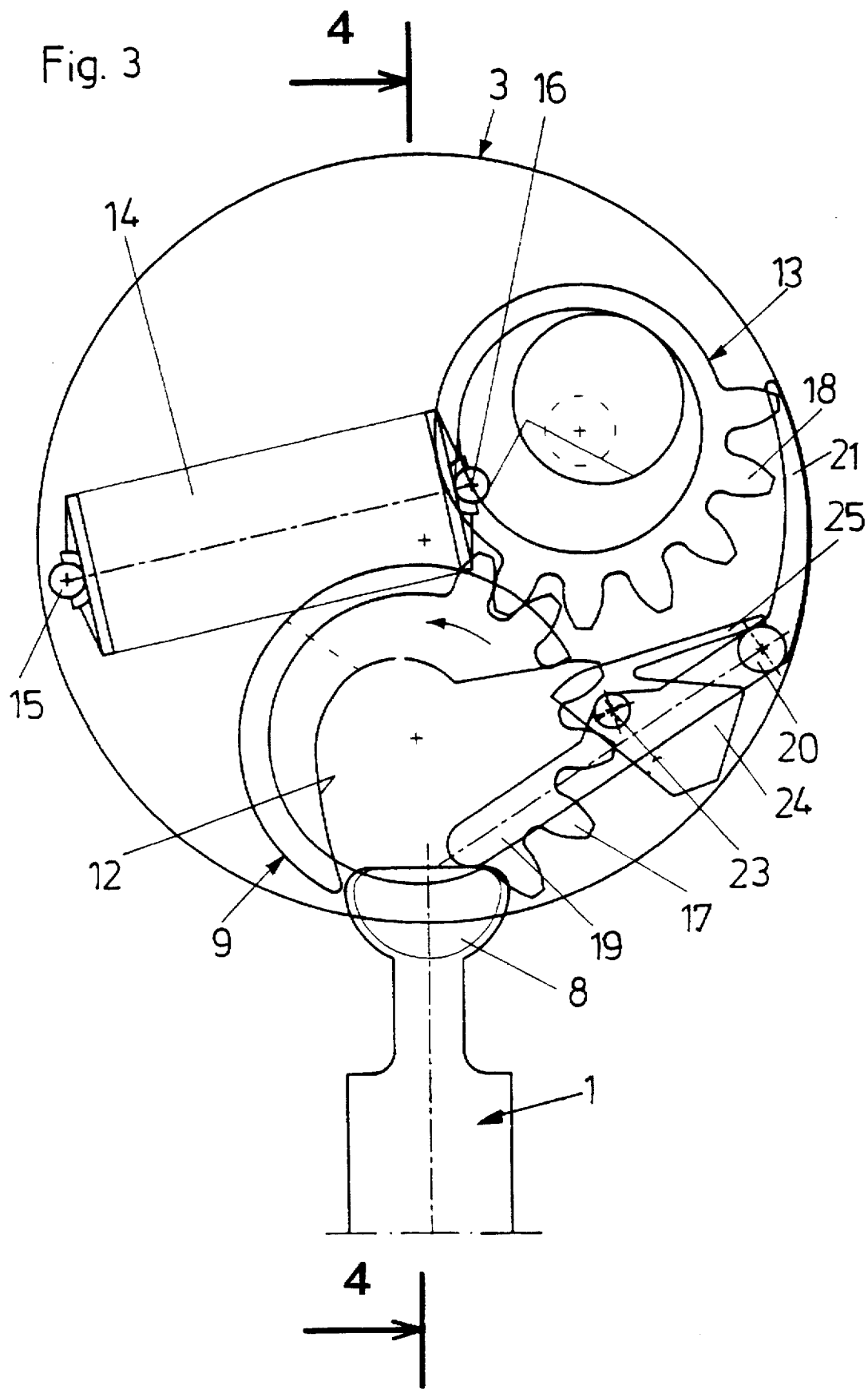
FIG. 3 is a schematic view of the casing with a pin-like connecting member position when it is inserted into the casing.
Figure 5:
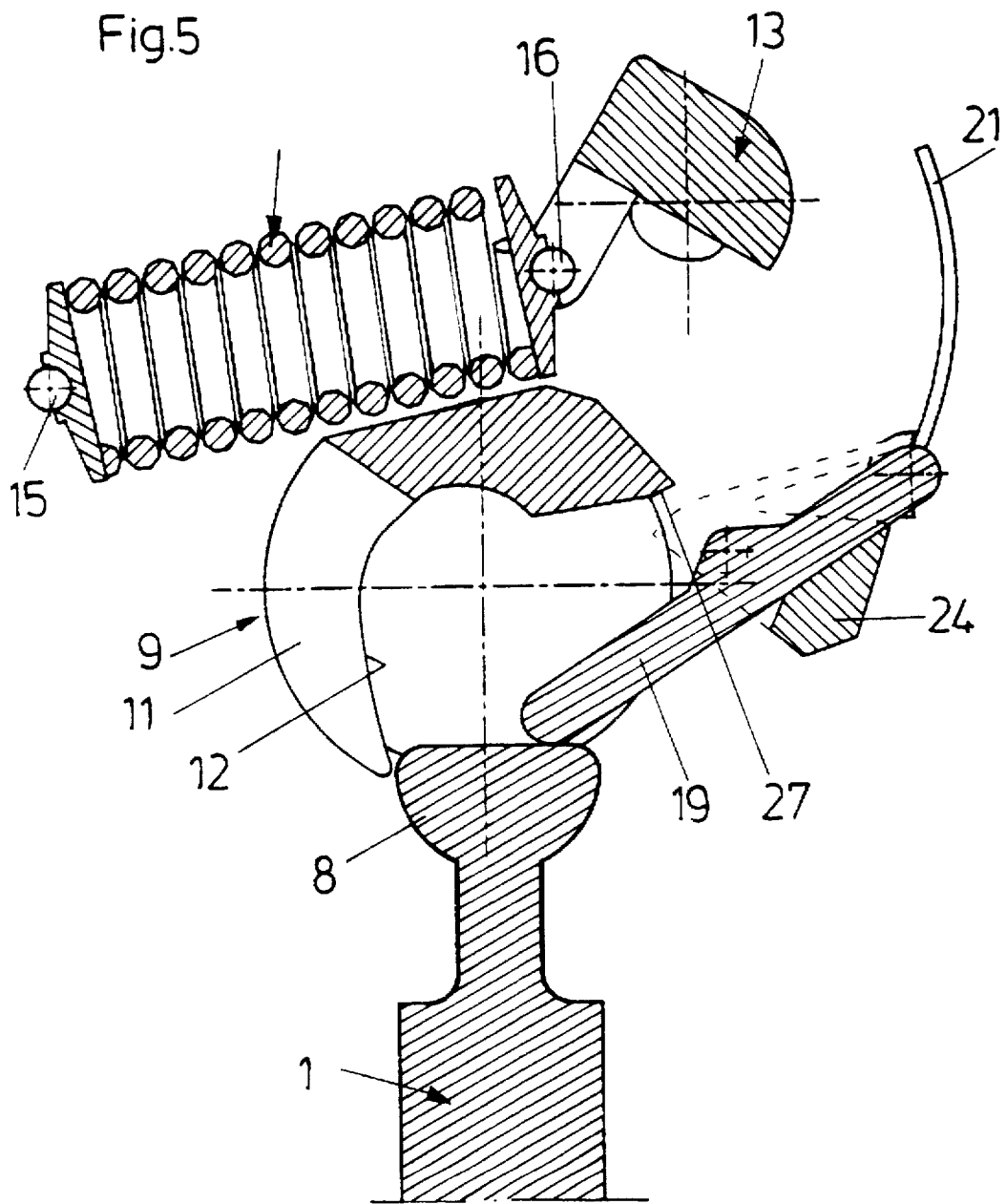
FIG. 5 is a sectional view taken on line 5—5 of FIG. 4.
Figure 6:
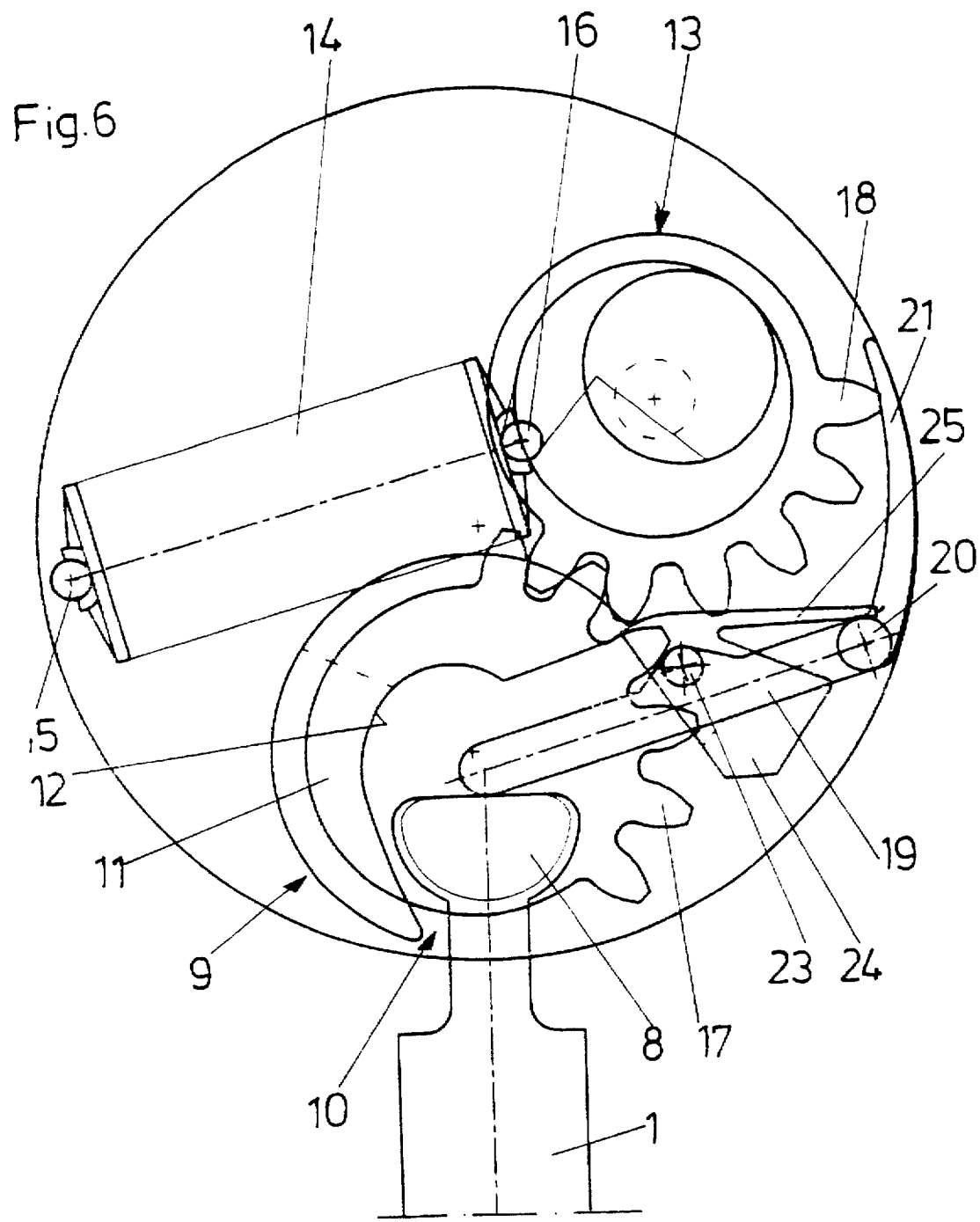
FIG. 6 is a schematic view similar to FIG. 3, but showing the position of the parts in the casing when the pin-like connecting has been inserted half way into the casing.
Figure 7:
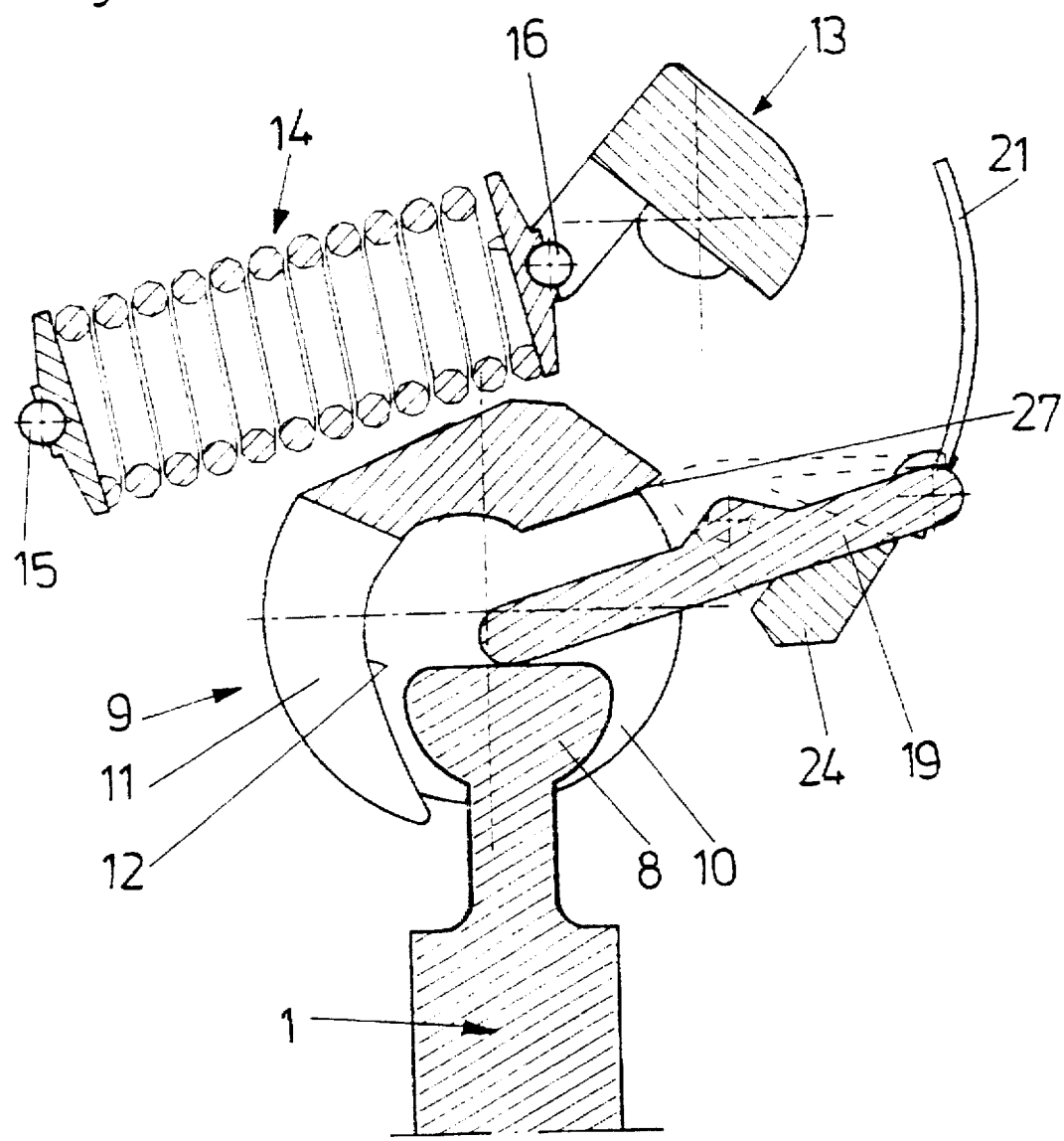
FIG. 7 is a sectional view similar to FIG. 5 but, showing position of FIG. 6.

At the beginning of the insertion of the pin-like connecting member 1 into the casting 3 the parts of connecting fitting are in the position shown in FIG. 3 and 5. The lever 19 is urged to the opening 7 be means of the spring 21, and the rotary wedge 9 is situated in such a way that the opening 10 is in front of the opening 7 of the casing 3. The spring 14 is underneath (with respect to the drawings) its dead center position.

Figure 8:
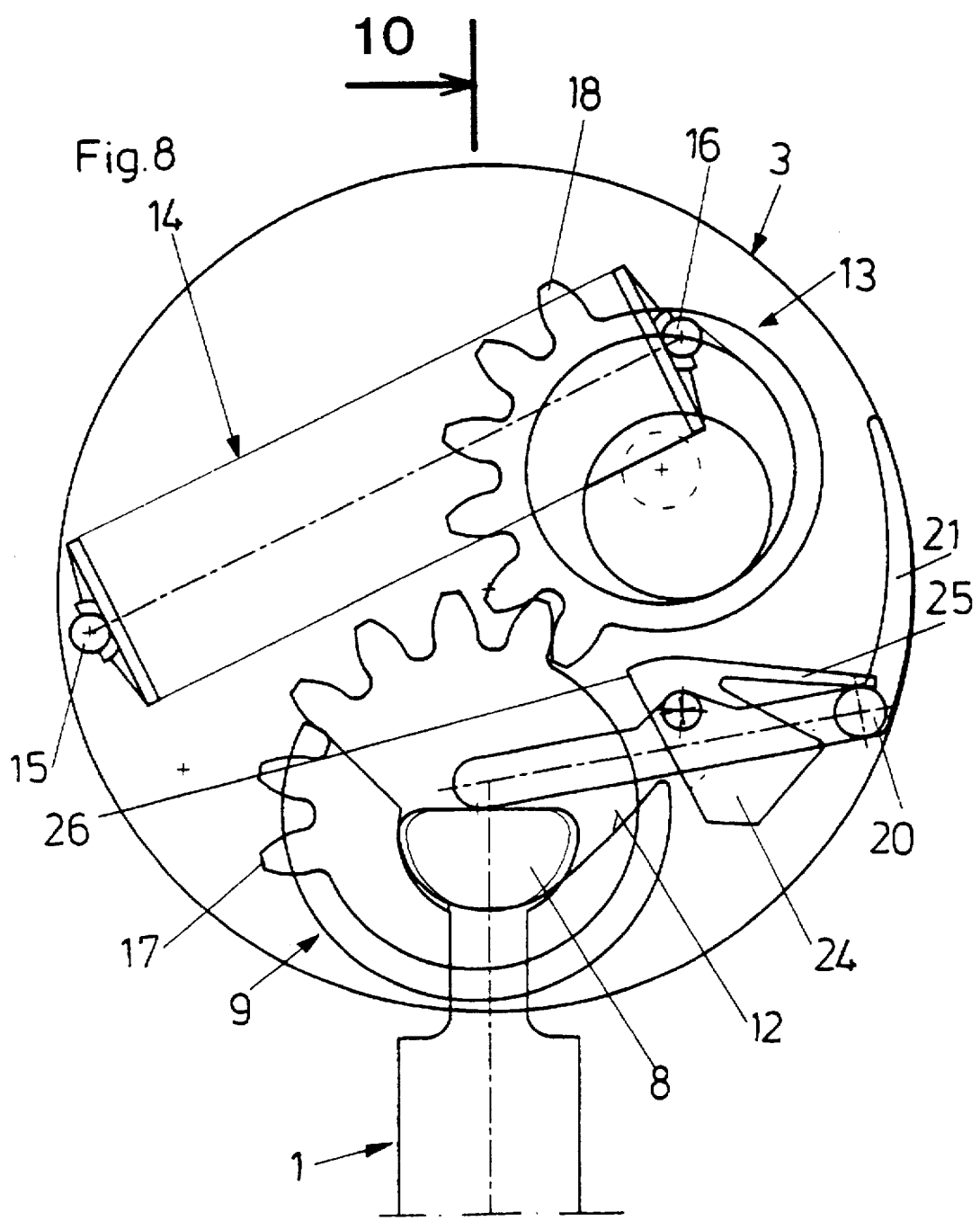
FIG. 8 is a schematic view similar to FIGS. 3 and 6, but showing the parts of the connecting fitting with the pin-like connecting member being in a fully arrested position.
Figure 9:
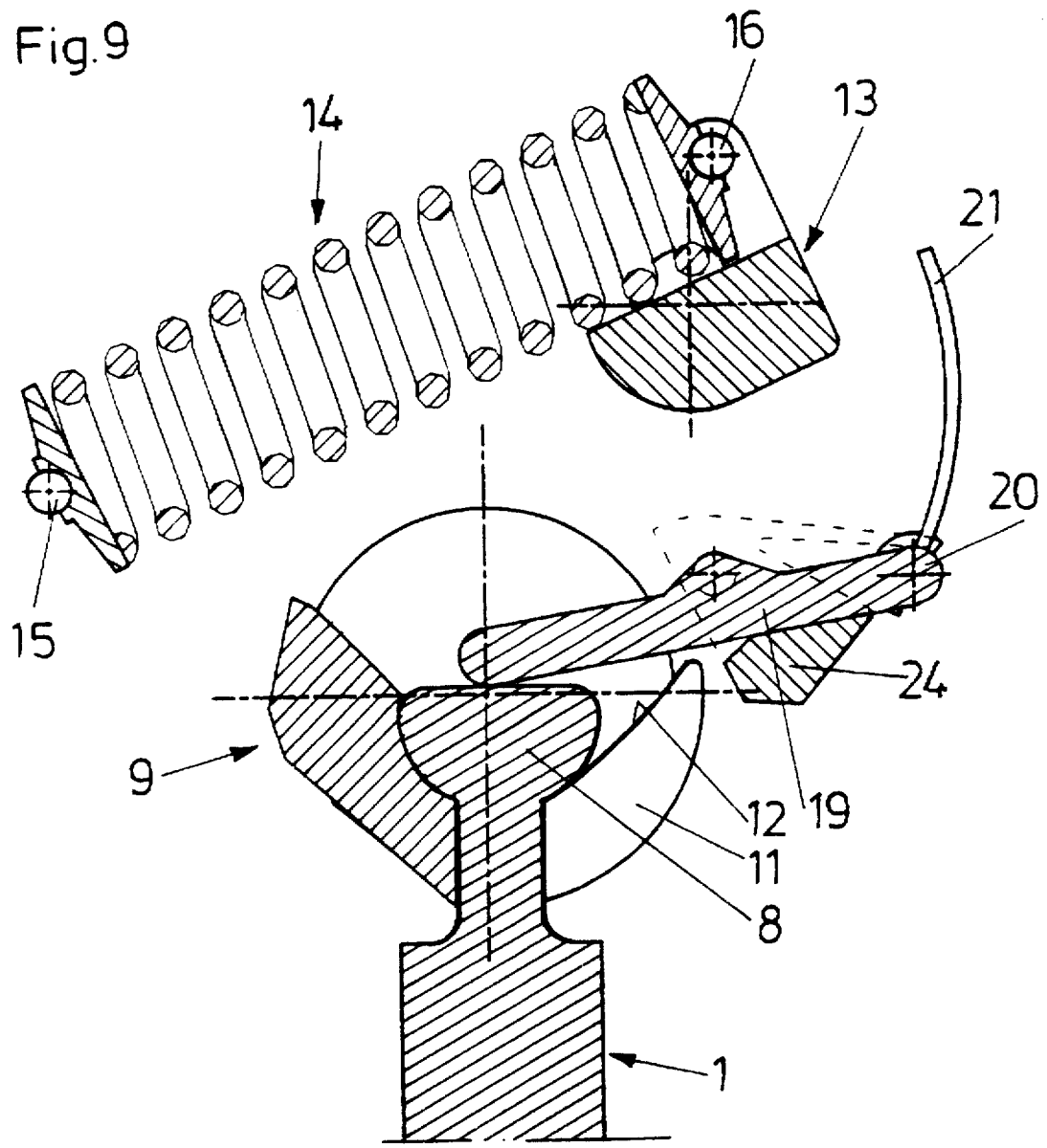
FIG. 9 is a sectional view similar to FIGS. 5 and 7, but showing positions of FIG. 8.

When the head 8 of the pin-like connecting member 1 abuts the free end of the lever 19 the lever 19 is moved clockwise around the axle 20. Thereby, a projection of nose 26 of the tilting lever 24 (FIG. 8) is pressed against a corresponding projection of nose 27 of the rotary wedge 9 (FIG. 5). When the pin-like connecting member 1 is further moved towards the middle of the casing 3 the tilting lever 24 which is tilted by means of the lever 19 rotates the rotating wedge 9 in the counter clockwise direction. Thereby, the rims 12 are moved underneath (with respect to the drawings) the head 8 of the pin-like connecting member 1. Because of the two toothed racks 17, 18, the tightening element 13 is rotated in the clockwise correction. Thereby, the spring 14 is compressed until it reaches its dead center position. When the rotary wedge 9 and the tightening element 13 are rotated such that spring 14 is moved beyond such dead center position, the spring 14 actively rotates the tightening element 13 in the clockwise direction whereby the rotary wedge 9 is moved in the counter clockwise direction because of the meshing racks 17, 18. Because of this rotation of the rotary wedge 9 to a retaining or locking positions the pin-like connecting member 1 is pulled further into the casing 3. This situation is shown in the FIGS. 8 and 9. The plate-like furniture parts 2, 4 thus are held together under tension.

Figure 15:
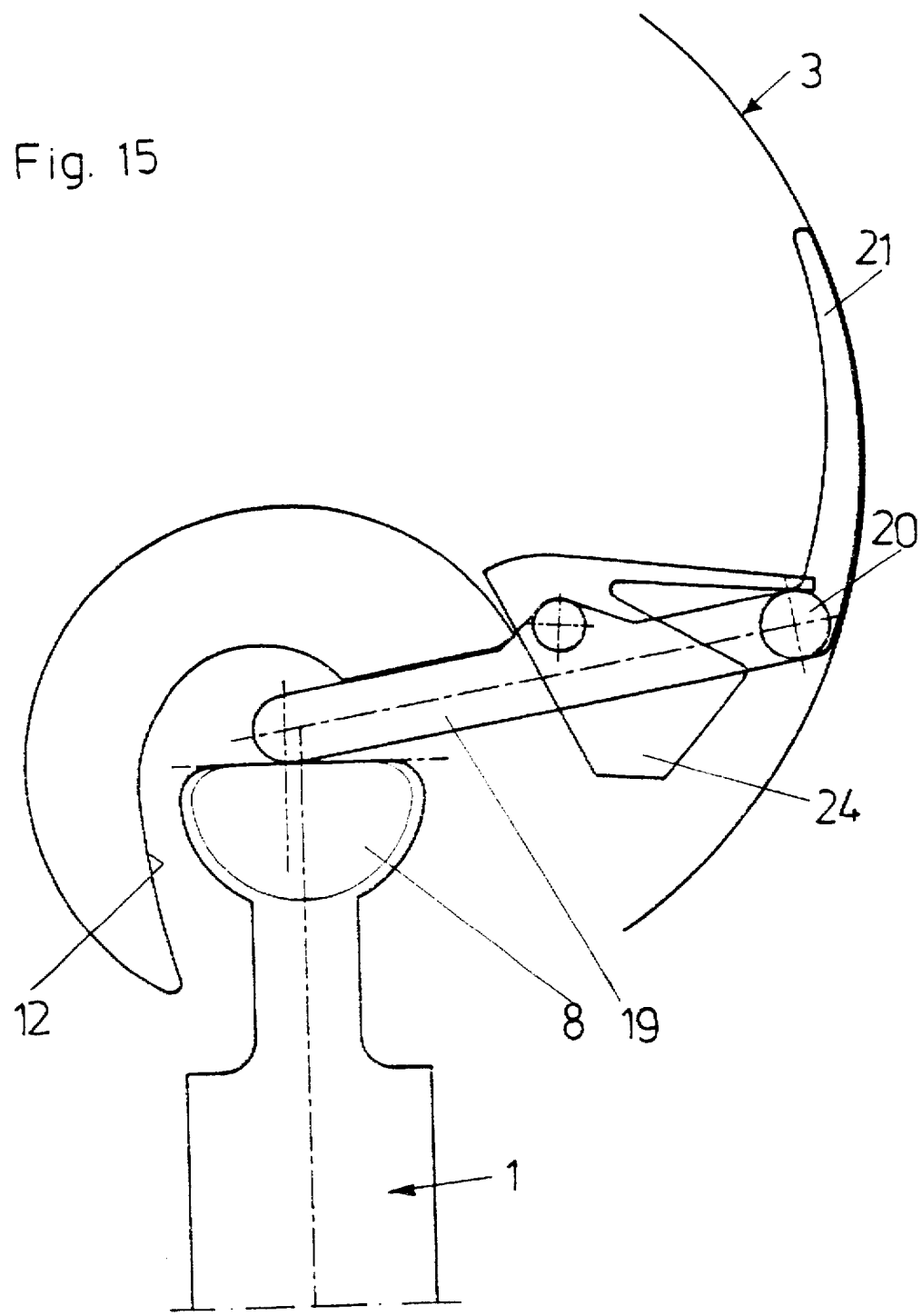
FIG. 15 is a schematic view of the parts of the locking mechanism with the pin-like connecting member being unlocked but still in an inserted position.
Figure 16:
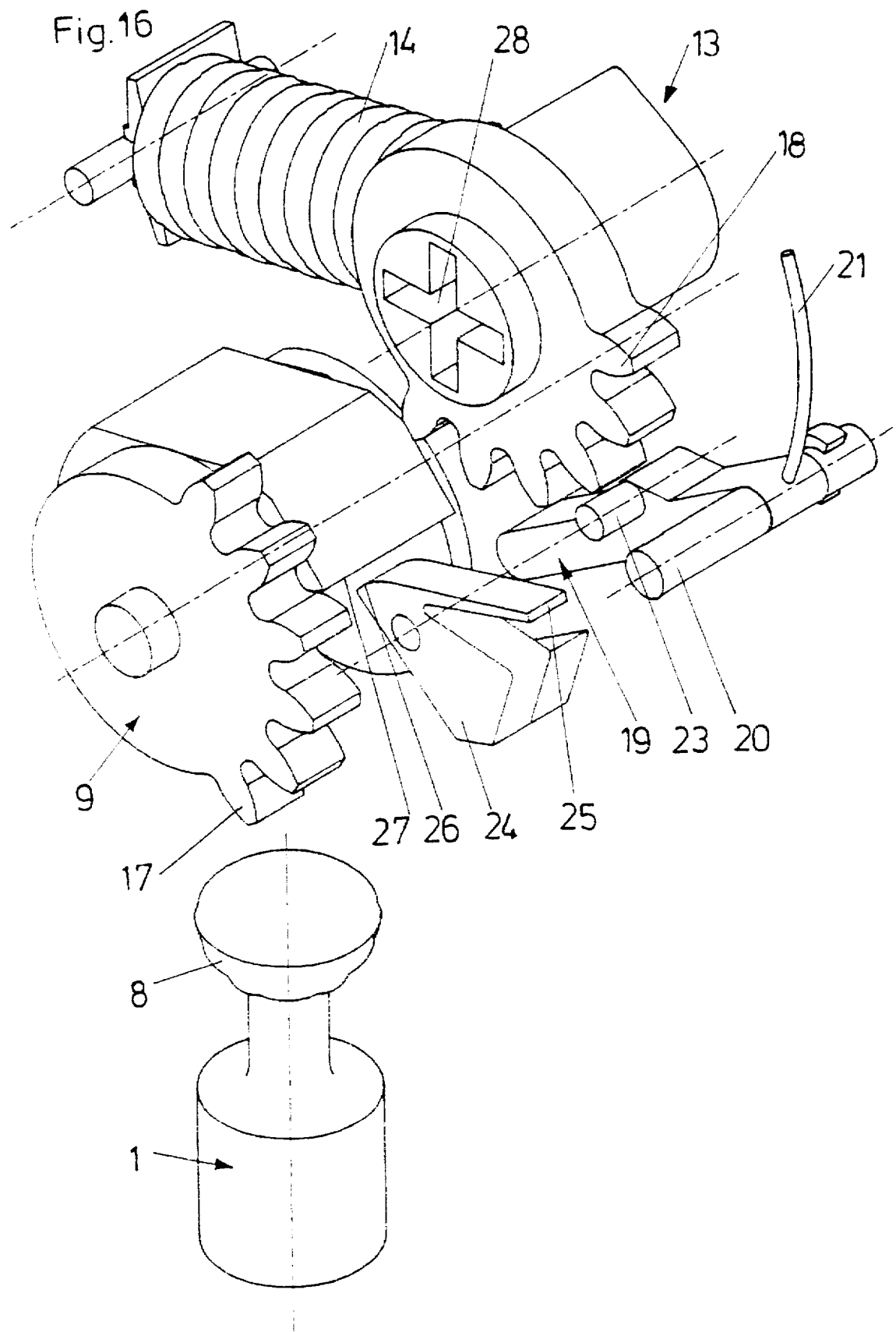
FIG. 16 is a perspective view of locking parts of the connecting fitting.
Figure 17:
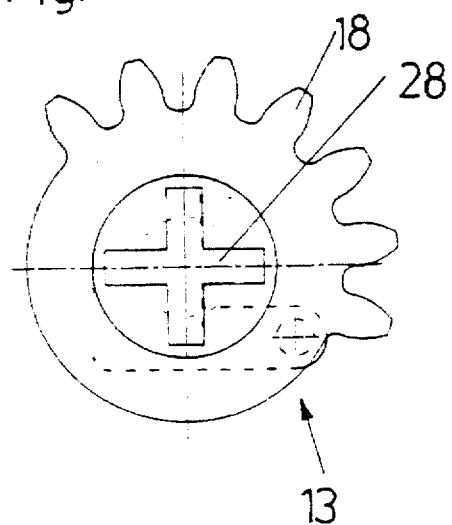
FIG. 17 is a front elevation of a tightening element.
Figure 18:
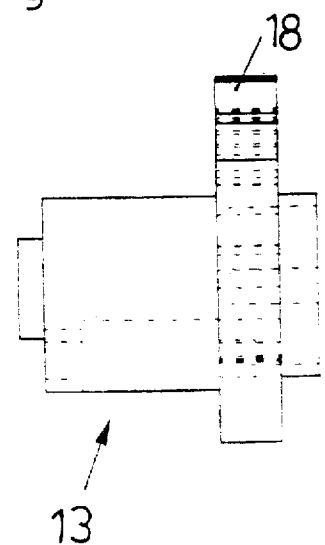
FIG. 18 is a side elevation of the tightening element.
Figure 19:
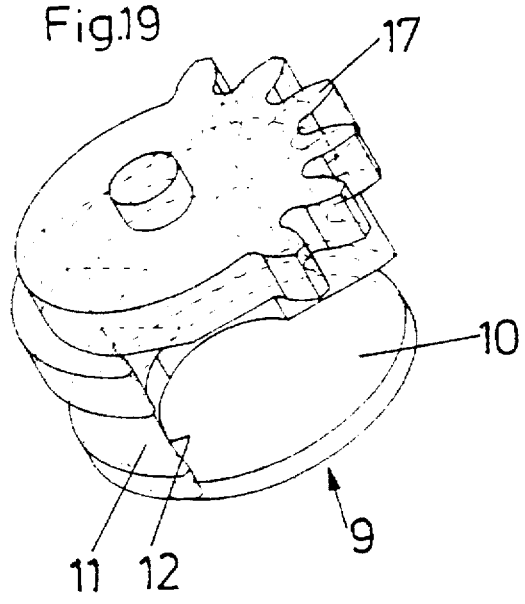
FIG. 19 is a perspective view of the rotary wedge.
Figure 20:
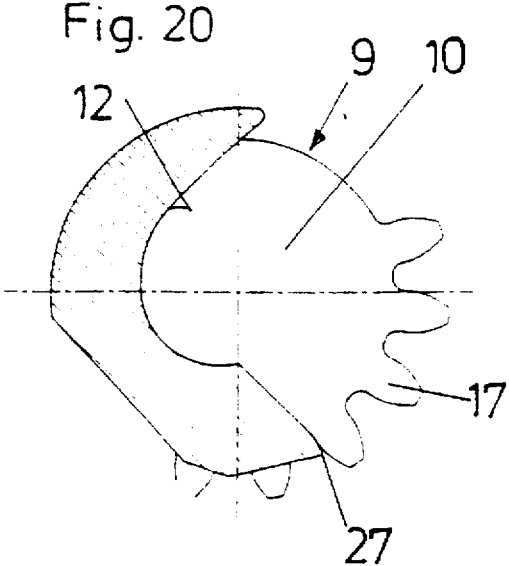
FIG. 20 is a sectional view of the rotary wedge.
Figure 21:
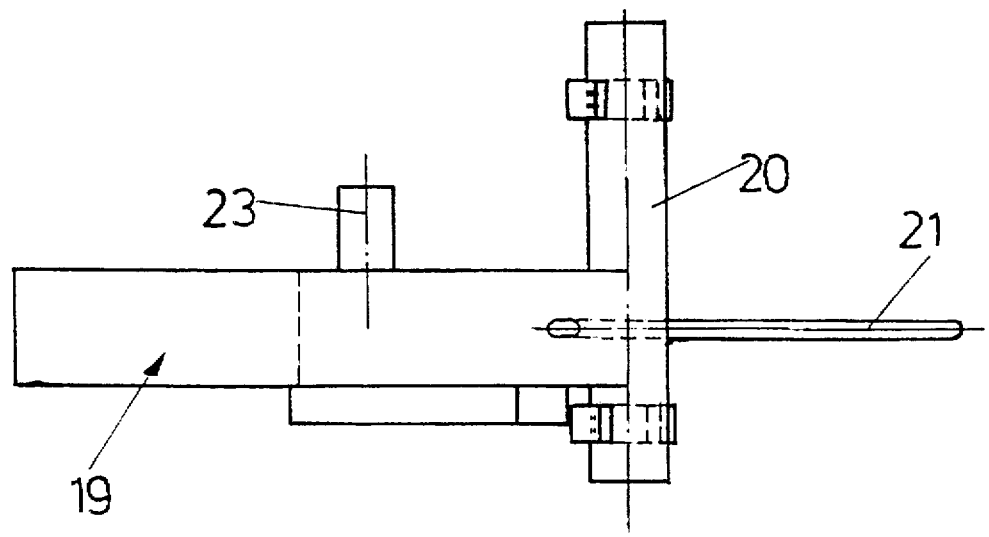
FIG. 21 is a plan view of the fitting lever.
Figure 22:
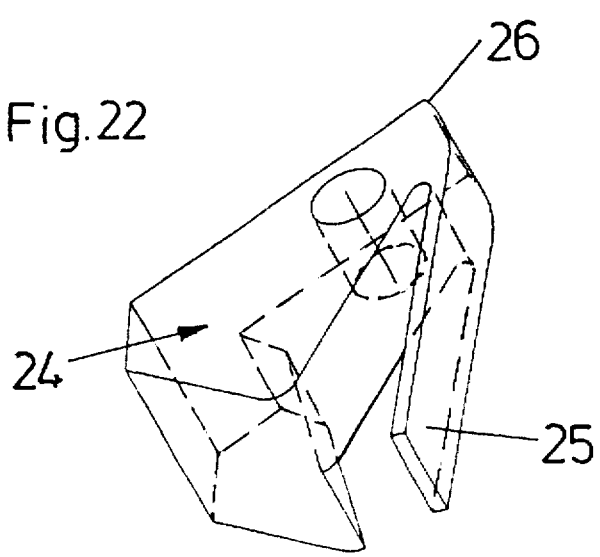
FIG. 22 is a perspective view of the tilting lever.

For achieving such locking arrangement it is not necessary to turn the rotary wedge 9 by means of a tool. To remove the pin-like connecting member from the rotary wedge 9, the tightening element 13 is rotated in the counter clockwise direction by means of a screw driver which is inserted into seat 28 of the tightening element 13 (FIG. 16). By rotating the tightening element 13 the rotary wedge 9 is turned in the clockwise direction and the rims 12 are removed from the head 8 of the pin-like connecting member 1. During rotation of the tightening element 13 and the rotary wedge 9, the position of the pin-like connecting member 1 in the casing 3 remains unchanged. Thus, the lever 19 and the tilting lever 24 remain in the position shown in FIG. 15. In this position the nose 27 of the rotary wedge 9 does not abut the nose 26 of the tilting lever 24, so that rotation of the rotary wedge 9 is not impeded. During rotation of the tightening element 13 and the rotary wedge 9, the spring 14 again is moved over its dead center position such that spring 14 does not urge the rotary wedge 9 toward its locking position. This position is shown in FIG. 3.

When the plate-like furniture parts 2,4 are removed from each other and the pin-like connecting member 1 is moved out of the casing 3, the spring 21 urges the lever 19 into the position shown in FIG. 3. Thereby the tilting lever 24 is rotated into its starting position by means of spring 25. In this position nose 26 projects underneath the nose 27 of the rotating wedge 9. When the pin-like connecting member 1 again is moved into the casing 3 the pin-like connecting member 1 will automatically be brought into locking engagement with the rotary wedge 9.

We claim:

1. A connecting fitting for releasably connecting two furniture parts, said fitting comprising:

a first connecting member to be secured to a first furniture part, said first connecting member being pin-shaped and including a shank and a head;

a second connecting member to be secured to a second furniture part, said second connecting member being a casing having therein an opening into which is insertable said head of said first connecting member;

a rotary wedge mounted in said casing for rotation in a first rotation direction to a retaining position engaging said head when said head is inserted into said opening;

a tightening element rotatably mounted in said casing, said tightening element being separate from said rotary wedge;

said rotary wedge and said tightening element being engaged such that rotation of said rotary wedge causes rotation of said tightening element and such that rotation of said tightening element causes rotation of said rotary wedge; and a spring mounted in said casing and operable on said tightening element to urge said tightening element to rotate.

2. A fitting as claimed in claim 1, wherein said spring is mounted such that, as said rotary wedge is rotated in said first rotation direction and causes rotation of said tightening element, said spring is moved past a dead center position.

3. A fitting as claimed in claim 2, wherein said spring is mounted such that, as said spring moves past said dead center position, said spring thereafter urges said tightening element to rotate and to cause said rotary wedge to rotate further in said first rotation direction.

4. A fitting as claimed in claim 1, wherein said spring is mounted such that, as said tightening element is rotated to cause rotation of said rotary wedge in a second rotation direction opposite to said first rotation direction, said spring is moved past a dead center position.

5. A fitting as claimed in claim 4, wherein said spring is mounted such that, as said spring moves past said dead center position, said spring thereafter urges said tightening element to rotate and to cause said rotary wedge to rotate further in said second rotation direction.

6. A fitting as claimed in claim 1, wherein said spring comprises a pressure spring.

7. A fitting as claimed in claim 1, further comprising a lever projecting into said rotary wedge to a position to be abutted by said head upon insertion of said head into said opening.

8. A fitting as claimed in claim 7, wherein said lever is pivotally mounted to be pivoted in a first pivot direction when abutted by said head.

9. A fitting as claimed in claim 8, further comprising a further spring acting on said lever to urge said lever to pivot in a second pivot direction opposite to said first pivot direction.

10. A fitting as claimed in claim 9, wherein said further spring abuts said casing.

11. A fitting as claimed in claim 8, further comprising a tilting lever mounted on said lever and pivotal therewith, said tilting lever being operable on said rotary wedge to, upon being pivoted with said lever in said first pivot direction by insertion of said head into said opening, rotate said rotary wedge in said first rotation direction.

12. A fitting as claimed in claim 11, wherein said tilting lever is pivotally mounted on said lever, and further comprising another spring biassing said tilting lever relative to said lever.

13. A fitting as claimed in claim 11, wherein said tilting lever has a projection to abut said rotary wedge to cause rotation thereof in said first rotary direction.

14. A fitting as claimed in claim 1, wherein said rotary wedge and said tightening element have respective toothed racks meshing with each other.

15. A fitting as claimed in claim 14, wherein each said rack extends in a circular arc.

16. A fitting as claimed in claim 14, wherein said rack of said rotary wedge comprises a segmental rack, and said tightening element comprises a toothed pinion meshing with said segmental rack.

17. A fitting as claimed in claim 14, wherein said rotary wedge and said tightening element have respective circular discs, and said racks are formed on circumferences of said discs.

18. A fitting as claimed in claim 1, wherein said tightening element has a seat for receiving a tool.

19. A fitting as claimed in claim 18, wherein said seat is shaped to receive a screw driver.

\* \* \* \* \*